Feb. 4, 1958   H. E. KEISTER   2,821,777
SLIDING CENTER MECHANICAL PULLER
Filed June 7, 1954
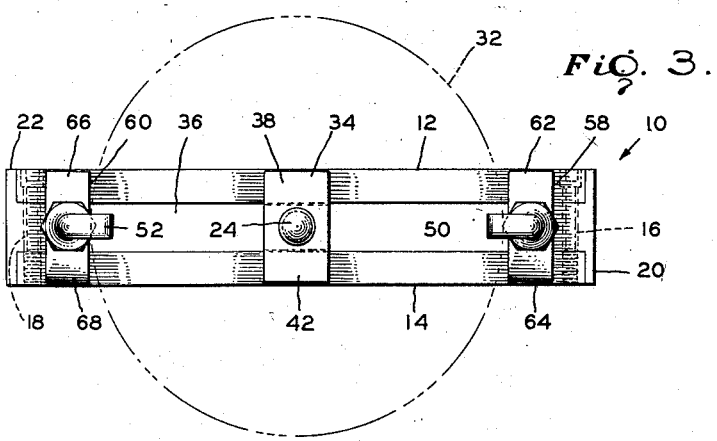
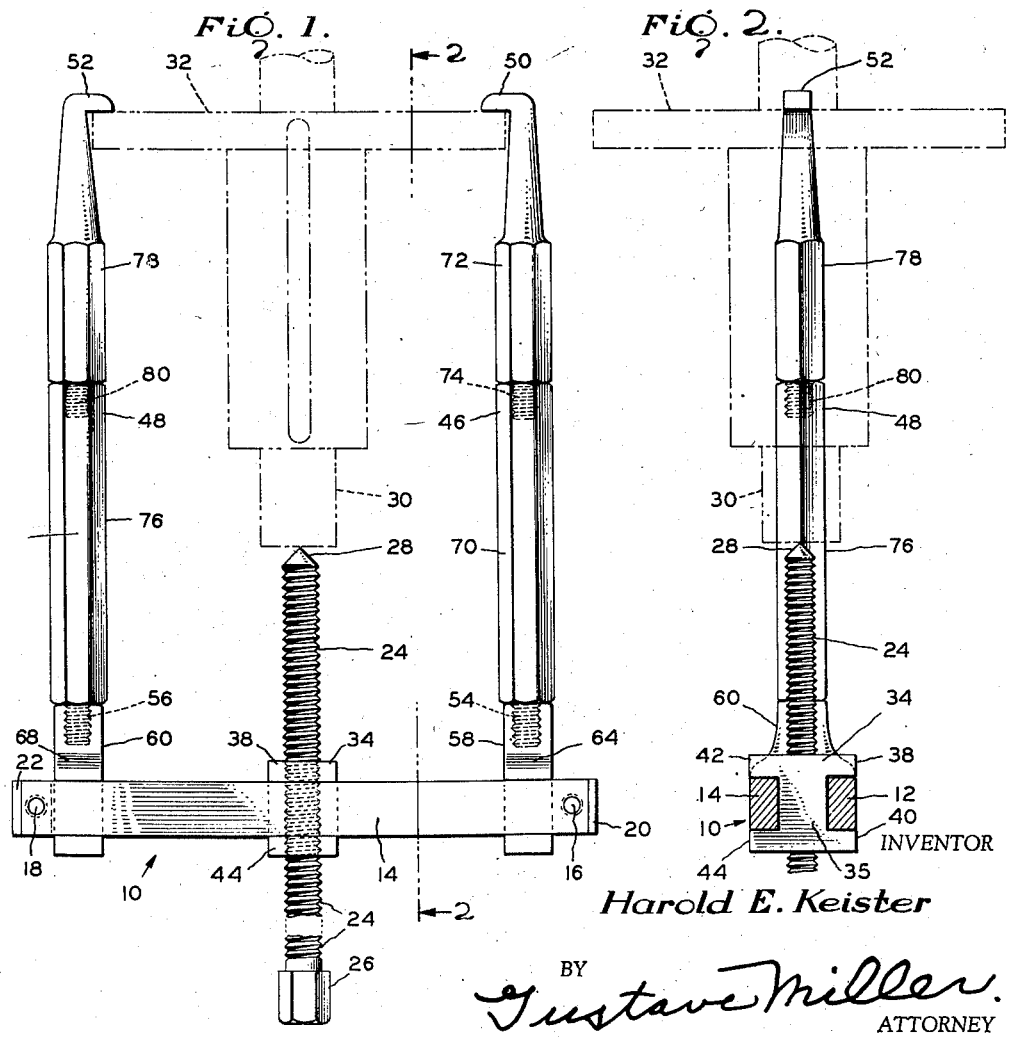
INVENTOR
Harold E. Keister
BY Gustave Miller
ATTORNEY

United States Patent Office 2,821,777
Patented Feb. 4, 1958

2,821,777

SLIDING CENTER MECHANICAL PULLER

Harold E. Keister, Rockford, Ill.

Application June 7, 1954, Serial No. 434,811

1 Claim. (Cl. 29—259)

This invention relates to a mechanical puller and particularly relates to a puller for removing cams, gears and the like from shafting as well as from cam and gear assemblies.

One of the objects of this invention is to provide a mechanical puller having an adjustable pressure means as well as adjustable pulling arms.

Another object of this invention is to provide a mechanical puller which is simple, has relatively few parts, is compact, and yet is capable of exerting great gripping and pulling strength.

Other objects of this invention are to provide an improved mechanical puller of the character described that is easily and economically produced, which is sturdy in construction, and which is highly efficient in operation.

With the above and related objects in view, this invention consists in the details of construction and combination of parts, as will be more fully understood from the following description when read in conjunction with the accompanying drawing in which:

Fig. 1 is a front elevational view of a device embodying this invention, showing it in operative position against a gear and gear shaft.

Fig. 2 is a side view of the device of Fig. 1 taken on line 2—2 of Fig. 1.

Fig. 3 is a top plan view of the device of Fig. 1.

Referring now in greater detail to the drawing wherein similar reference characters refer to similar parts, there is shown a cross-beam 10 comprising a pair of parallel rails 12 and 14 made of heavy steel or the like and held together by a pair of bolts 16 and 18 extending through end portions 20 and 22.

Slidably mounted on the cross-beam 10 is a pressure or abutment member 24 in the form of a threaded bolt or rod having a polygonal head 26 at one end to receive a wrench or similar tool, and at the other end a hardened tip 28 for frictionally engaging a workpiece such as the shaft of a gear, this shaft and gear being indicated in dotted outline at 30 and 32. The bolt 24 threadedly extends through a bearing 34, this bearing having a central portion 35 which fits in the slot 36 between the rails 12 and 14 and having laterally extending upper and lower flanges at opposite sides, as at 38, 40, 42 and 44. These upper and lower flanges slidably embrace the upper and lower faces of the rails 12 and 14, as best illustrated in Fig. 2.

As shown, the parts are so constructed that the sliding fit between the flanges on the bearing and the rails is close enough to permit relative movement of the bearing 34 laterally of the cross-bar but to prevent such relative movement under longitudinal pressure on the bolt 24. However, it is within the scope of this invention to provide openings in any or all of the flanges 38, 40, 42 and 44, to permit the insertion of a set-screw or the like to lock the bearing against movement on the rails once it has been adjusted to a desired position.

Also slidable on the cross-beam 10 are a pair of gripping arms 46 and 48 having lateral hook or gripping portions as at 50 and 52. These arms are provided with screw-threaded extensions 54 and 56 which are threadedly insertable into threaded sockets provided in blocks 58 and 60. These blocks 58 and 60 are each provided with upper and lower flanges, similar to the flanges on the bearing 34, for slidably embracing the rails 12 and 14, the upper flanges being shown at 62 and 64 for block 58 and at 66 and 68 for block 60.

It should be noted that by this construction, not only may various sizes and shapes of gripping arms be substituted for the arms 46 and 48 but also, by means of screwing the arms 46 and 48 more or less completely into the threaded sockets in their respective slidable blocks, the effective length of these arms may be varied. Furthermore, the arms may be made of separable parts, as illustrated, wherein the arm 46 has a lower portion 70 and an upper hook portion 72 which has a threaded extension 74 threadedly insertable into a complementary socket at the top of the portion 70. The arm 48 is similarly composed of a lower portion 76 and an upper hook portion 78 which is adapted to be attached to the portion 76 by means of a threaded extension 80. This permits the substitution of various sizes and shapes of hook portions as well as the insertion of extensions between the two portions. It also permits the elimination of the portions 70 and 76 and the direct attachment to the blocks of the hook portions 72 and 78. The entire device is preferably made of solid steel or other very strong material.

Although the invention is illustrated as having the parts arranged so that the gripping arms are provided one on either side of the pressure bolt 24, it is within the scope of the invention to place both arms at one side of the pressure bolt where the work to be performed requires such arrangement. Also, pressure bolt by this construction, can be adjusted to any lateral position which best adapts the device to handle a particular type of work.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A mechanical puller comprising an elongated cross-beam consisting of a pair of parallel bars, a spacing abutment at each end of said bars and a securing bolt extending transversely of said bars through each of said spacing abutments holding said bars in secure, spaced apart rigid relationship, a pair of gripping members adjustably slidable on said cross-beam between said spaced apart bars thereof intermediate said spacing abutments, said gripping members each including an H-shaped block having its web fitting snugly yet slidably between said bars and its flanges riding slidably on the top and bototm of said bars, each said H block having an upwardly extending threaded bore portion, a connecting arm having a threaded male end complementary to said threaded bore of said H block at one end and a similar threaded bore at its other end, and a hook member having a similar threaded male end, and a third H-shaped block slidably riding between and on said bars intermediate said first two H-shaped blocks, said third block having a threaded opening therethrough, and a threaded pressure member extending through said opening, said pressure member extending in the same longitudinal direction as said gripping members.

References Cited in the file of this patent

UNITED STATES PATENTS

| | | |
|---|---|---|
| 1,410,191 | Karraker | Mar. 22, 1922 |
| 1,431,378 | Derry | Oct. 10, 1922 |
| 1,436,081 | Brockway | Nov. 21, 1922 |

FOREIGN PATENTS

| | | |
|---|---|---|
| 664,000 | France | Apr. 16, 1929 |